US006765030B2

(12) United States Patent
DeSimone et al.

(10) Patent No.: US 6,765,030 B2
(45) Date of Patent: Jul. 20, 2004

(54) METHODS OF FORMING POLYMERIC STRUCTURES USING CARBON DIOXIDE AND POLYMERIC STRUCTURES FORMED THERAPY

(75) Inventors: Joseph M. DeSimone, Chapel Hill, NC (US); Sara Naomi Paisner, Carrbero, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 10/109,588

(22) Filed: Mar. 28, 2002

(65) Prior Publication Data

US 2003/0180522 A1 Sep. 25, 2003

Related U.S. Application Data

(60) Provisional application No. 60/367,141, filed on Mar. 22, 2002.

(51) Int. Cl.[7] .............................. C08J 9/02; C08J 9/08
(52) U.S. Cl. ............................ 521/77; 521/61; 521/64; 521/97
(58) Field of Search .............................. 521/61, 64, 97, 521/77

(56) References Cited

U.S. PATENT DOCUMENTS

| 4,136,137 A | 1/1979 | Hsieh et al. |
|---|---|---|
| 5,281,666 A | 1/1994 | Hoxmeier |
| 5,451,633 A | 9/1995 | DeSimone et al. |
| 5,589,105 A | 12/1996 | DeSimone et al. |
| 5,639,836 A | 6/1997 | DeSimone et al. |
| 5,674,957 A | 10/1997 | DeSimone et al. |
| 5,676,705 A | 10/1997 | Jureller et al. |
| 5,683,977 A | 11/1997 | Jureller et al. |
| 5,783,082 A | 7/1998 | DeSimone et al. |
| 6,319,858 B1 | 11/2001 | Lee et al. |
| 2002/0020946 A1 | 2/2002 | Hirakoa et al. |

FOREIGN PATENT DOCUMENTS

| EP | 1 085 041 | 3/2001 | .............. C08J/9/26 |
|---|---|---|---|
| EP | 1 211 280 | 6/2002 | .............. C08J/9/28 |

OTHER PUBLICATIONS

Chen, Vanessa Z.–H., et al., *Ordered Bicontinuous Nanoporous and Nanorelief Ceramic Films from Self Assembling Polymer Precursors*, Science, vol. 286, pp. 1716–1719 (Nov. 26, 1999).

Dang, T.D. et al., *Synthesis and Characterization of Fluorinated Benzoxazole Polymers with High $T_g$ and Low Dielectric Constant*, Journal of Polymer Science, vol. 38, pp. 1991–2003 (2000).

Hedrick, J.L., et al., *High–temperature polyimide nanofoams for microelectronic applications*, Reactive & Functional Polymers, vol. 30, pp. 43–53 (1996).

Hyatt, John A., *Liquid and Supercritical Carbon Dioxide as Organic Solvents*, Journal of Organic Chemistry, vol. 49, No. 26, pp. 5097–5101 (1984).

Maier, Gerhard, *Polymers for microelectronics*, materistoday, pp. 22–33 (Sep./Oct. 2001).

Maier, G., *Low dielectric constant polymers for microelectronics*, Progress in Polymer Science, vol. 26, pp. 3–65 (2001).

Milner, Scott, T., et al., *Analytical Weak–Segregation Theory of Bicontinuous Phases in Diblock Copolymers*, J. Phys. II France, vol. 7, pp. 249–255 (1997).

Olmsted, Peter D., et al., *Fluctuation Corrections to Mean–Field Theory for Homopolymer–Copolymer Phase Separation: Sequence Distribution Effects*, Macromolecules, vol. 27, pp. 1964–1967 (1994).

Olmsted, P.D. et al., *Lifshitz points in blends of AB and BC diblock copolymers*, Europhysics Letters, vol. 45, No. 1, pp. 83–89 (1999).

Olmsted, Peter D., et al., *Strong–Segregation Theory of Bicontinuous Phases in Block Copolymers*, Physical Review Letters, vol. 72, No. 6, pp. 936–941 (Feb. 7, 1994).

Olmsted, Peter D., et al., Errata, *Strong–Segregation Theory of Bicontinuous Phases in Block Copolymers*, Physical Review Letters, vol. 74, No. 5, p. 829 (Jan. 30, 1995).

Olmsted, Peter D., et al., *Strong–Segregation Theory of Bicontinuous Phases in Block Copolymers*, Macromolecules, vol. 31, pp. 4011–4022 (1998).

Rajagopal, A., et al., *Surface characterization of a low dielectric constant polymer–SiLK\* polymer, and investigation of its interface with Cu*, J. Vac. Sci. Technol., vol. B 17, No. 5, pp. 2336–2340 (Sep/Oct 1999).

Rockford, L., et al., *Propagation of Nanopatterned Substrate Templated Ordering of Block Copolymers in Thick Films*, Macromolecules, vol. 34, pp. 1487–1492 (2001).

Sroog, C.E., *Polymides*, Progress in Polymer Science, vol. 16, pp. 561–694 (1991).

Zalusky, Andrew S., et al., *Mesoporous Polystyrene Monoliths*, J. Am. Chem. Soc., vol. 123, pp. 1519–1520 (2001).

*Low dielectric constant materials for advanced microelectronics*, www.almaden.ibm.com/st/projects/lowk, 3 pages.

Primary Examiner—Morton Foelak
(74) Attorney, Agent, or Firm—Myers Bigel Sibley & Sajovec, P.A.

(57) ABSTRACT

Methods of forming a polymeric structure having a plurality of cells therein that include contacting a polymeric material that includes a first phase and a second phase with a composition comprising carbon dioxide to form the polymeric structure having a plurality of cells therein are described. Polymeric materials and microelectronic devices formed by such methods are also described.

62 Claims, 4 Drawing Sheets

METHODS OF FORMING POLYMERIC STRUCTURES USING CARBON DIOXIDE AND POLYMERIC STRUCTURES FORMED THERAPY

RELATED APPLICATION

This application claims the benefit of U.S. Provisional Application No. 60/367,142, filed Mar. 22, 2002, to DeSimone et al., entitled "Methods Of Forming Polymeric Structures Using Carbon Dioxide And Polymeric Structures Formed Thereby," application serial number not yet assigned, the disclosure of which is incorporated herein by reference in its entirety.

STATEMENT OF FEDERAL SUPPORT

This invention was made possible with government support from the National Science Foundation under Agreement No. CHE-9876674. The United States government has certain rights to this invention.

FIELD OF THE INVENTION

The present invention generally relates to processes for preparing polymeric materials using carbon dioxide and polymeric materials formed thereby.

BACKGROUND OF THE INVENTION

The formation of well-ordered mesopores in a bulk material is desirable for many applications including separations, anisotropic transport, high surface area catalytic monoliths, and others. Block and graft copolymers may form microphase separated morphologies such as spheres, cylinders and lamellas, which can be used to control the orientation of nanostructures of large areas.

Rockford, L. et al., *Macromolecules*, 34: 1487 (2001) propose films of symmetric diblock copolymers of poly(styrene-block-methyl methacrylate) solution cast onto silicon oxide substrates striped with periodic, 20 nm wide gold lines believed to show lamellar microdomain orientation perpendicular to the substrate plane and parallel to the striping.

Zalutsky, A. S. et al., *J. A. Chem. Soc.*, 123: 1519–1520 (2001) propose a method for the formation of a mesoporous polystyrene monolith thought to contain close-packed aligned nanochannels. This method entails the preparation of diblock copolymers containing oriented nanoscopic cylinders of degradable polylactide embedded in polystyrene followed by selective removal of polylactide using an aqueous methanol mixture containing sodium hydroxide.

In another method, Chan, V. Z.-H. et al, *Science*, 286: 1716 (1999) propose producing porous and relief ceramic nanostructures from self-assembling (template-free) block copolymer precursors comprising silicon-containing triblock copolymer films, with a one-step, low-temperature technique.

It has been proposed that polymers possessing a low dielectric constant may serve as insulators for microelectronic devices. See Maier, G. et al. *Prog. Polym. Sci.* 26: 3–65 (2001).

Dang, T. D. et al., *J. Polym. Sci. A: Polym. Chem.* 38: 1991–2003 (2000) propose the synthesis and characterization of fluorinated benzoxazole polymers. The reference proposes incorporation of perfluoroisopropyl groups along the polymer backbone to contribute to lowered dielectric properties, and that an increase in the number of fused rings along the backbone structure may increase the glass-transition temperature ($T_g$).

Rajagopal A. et al., *J. Vac. Sci. Technol. B*, 17(5): 2336–2340 (1999) couples x-ray photoelectron spectroscopy with in situ sample annealing and copper thermal evaporation to study the stability of SiLK™ surface and the physico-chemical interactions at the metal-polymer interface. The reference proposes that upon anneal, copper may tend not to diffuse into the SiLK™ semiconductor dielectric but to coalesce in larger clusters on the resin.

Hedrick, J. L et al., *Reactive & Functional Polymers*, 30: 43–53 (1996) propose the use of phase separated block copolymers comprised of a high thermally stable $T_g$ polymer and a second component, which can undergo clean thermal decomposition with the evolution of volatile by-products to form what may be a closed-cell porous structure.

There is a need in the art for improved methods of forming polymeric structures and a need in the art for improved polymeric structures.

SUMMARY OF THE INVENTION

Methods according to embodiments of the present invention provide polymeric structures that possess beneficial dielectric and/or physical (e.g., size, cell size, cell type, cell density, etc.) characteristics. Such polymeric structures may be advantageously employed in a variety of ways. For example, such polymeric structures may be utilized in microelectronic devices. Advances in microelectronics have resulted in the need for smaller components and, thus, smaller microelectronic devices. As these devices become smaller, the distance between the electrically conducting interconnect lines decreases resulting in an increase in inductive and capacitive effects. Polymeric structures according to embodiments of the present invention having beneficial dielectric and/or physical characteristics may be utilized as dielectric materials in such smaller microelectronic devices.

According to other embodiments of the present invention, methods of forming a polymeric structure having a plurality of cells therein include contacting a polymeric material that includes a first phase that comprises a first polymer, and a second phase that comprises a second polymer, with a composition comprising carbon dioxide and a chemical decomposition agent to remove the second polymer from the polymeric material to form the polymeric structure having a plurality of cells therein.

According to still other embodiments of the present invention, methods of forming a polymeric structure having a plurality of cells therein where the plurality of cells have an average diameter of from about 1 to 25 nm are provided. The methods include contacting a polymeric material that includes a first phase that comprises a first polymer, and a second phase that comprises a second polymer, with a composition comprising carbon dioxide to remove the second polymer from the polymeric material to form the polymeric structure having a plurality of cells therein where the plurality of cells have an average diameter of from about 1 to 25 nm.

According to yet other embodiments of the present invention, methods of forming a polymeric structure having a plurality of cells therein where the polymeric structure has a dielectric constant of from about 1.5 to 3.5 are provided. The methods include contacting a polymeric material including a first phase that comprises a first polymer, and a second phase that comprises a second polymer, with a composition comprising carbon dioxide to remove the second polymer from the polymeric material to form the polymeric structure having a plurality of cells therein where the polymeric structure has a dielectric constant of from about 1.5 to 3.5.

According to still other embodiments of the present invention, methods of forming a polymeric structure having a plurality of cells therein include contacting a polymeric material comprising a copolymer having two or more phases with a composition comprising carbon dioxide and a chemical decomposition agent to remove at least one of the two or more phases from the polymeric material to form the polymeric structure having a plurality of cells therein. The copolymer includes a continuous first phase that comprises a first polymer chain, and a second phase that comprises a second polymer chain.

According to yet other embodiments of the present invention, methods of forming a polymeric structure having a plurality of cells therein where the plurality of cells have an average diameter of from about 1 to 25 nm are provided. The methods include contacting a polymeric material that includes a copolymer having two or more phases with a composition comprising carbon dioxide to remove at least one of the two or more phases form the polymeric structure having a plurality of cells therein where the plurality of cells have an average diameter of from about 1 to 25 nm. The copolymer includes a continuous first phase that comprises a first polymer chain, and a second phase that comprises a second polymer chain.

According to still other embodiments of the present invention, methods of forming a polymeric structure having a plurality of cells therein where the polymeric material has a dielectric constant of from about 1.5 to 3.5 include contacting a polymeric material that comprises a copolymer having two or more phases with a composition comprising carbon dioxide to remove at least one of the two or more phases from the polymeric material to form the polymeric structure having a plurality of cells therein, wherein the polymeric structure has a dielectric constant of from about 1.5 to 3.5. The copolymer includes a continuous first phase that comprises a first polymer chain, and a second phase that comprises a second polymer chain.

According to other embodiments of the present invention, methods of forming a polymeric film for use as a dielectric material in a microelectronic device are provided. The methods include contacting a polymeric material that comprises a copolymer having two or more phases with a composition comprising carbon dioxide to remove at least one of the two or more phases from the polymeric material to form the polymeric film for use as a dielectric material in a microelectronic device. The copolymer includes a continuous first phase that comprises a first polymer chain, and a second phase that comprises a second polymer chain.

According to still other embodiments of the present invention, methods of forming a polymeric film for use as a dielectric material in a microelectronic device include contacting a polymeric material comprising a first phase that includes a first polymer and a second phase that includes a second polymer with a composition comprising carbon dioxide to remove the second polymer from the polymeric material to form the polymeric film for use as a dielectric material in a microelectronic device.

According to yet other embodiments of the present invention, polymer structures include a polymeric matrix having a plurality of cells therein where the plurality of cells have an average diameter of from about 1 to 25 nm.

According to still other embodiments of the present invention, microelectronic devices include a dielectric material that comprises a polymeric matrix having a plurality of cells therein where the plurality of cells have an average diameter of from about 1 to 25 nm.

DETAILED DESCRIPTION OF PREFERRED EMBODIMENTS

Figure 1:
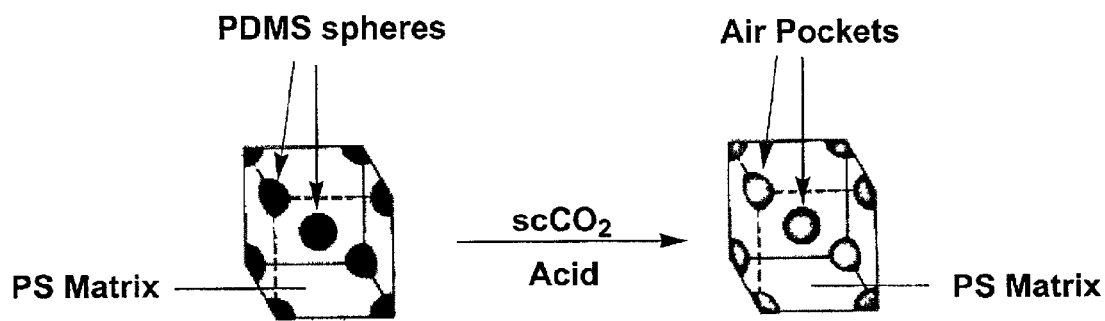
FIG. 1 illustrates a schematic removal of polydimethylsiloxane (PDMS) from a polystyrene (PS) matrix to form polystyrene foam with pores therein according to embodiments of the present invention.

The invention will now be described in detail with respect to the foregoing preferred embodiments described in the specification, drawings, and examples. It should be noted, however, that these embodiments are for the purposes of illustrating the invention and do not limit the invention as defined by the claims in the following section. While some of the values described herein for the lower limits of ranges may be higher than some of the values described for the upper limits, it is to be understood that when selecting a given range of values, the lower limit selected will be lower than the upper limit selected.

As used herein, phrases such as "between X and Y" and "between about X and Y" should be interpreted to include X and Y.

As used herein, phrases such as "between about X and Y" mean "between about X and about Y."

As used herein, phrases such as "from about X to Y" mean "from about X to about Y."

As used herein, the term "cells" encompasses morphologies such as lamellae, ordered bicontinuous double-diamond (OBDD) phases, cylinders, spheres, voids and pores.

As used herein, the term "supercritical" means that a fluid medium is at a temperature that is sufficiently high that it cannot be liquefied by pressure. The thermodynamic properties of $CO_2$ are reported in Hyatt, *J. Org. Chem.* 49: 5097–5101 (1984) which reference is incorporated herein by reference in its entirety; therein, it is stated that the critical temperature of $CO_2$ is about 31° C.

As used herein, the term "polymer" encompasses homopolymers, copolymers, terpolymers, and the like as well as all miscible and/or immiscible blends and/or mixtures thereof.

As used herein, the term "block copolymer" means a copolymer comprising a plurality of individual polymer chains as partial constituent components (i.e., blocks) and also refers to block di-block, tri-block, or multi-block co-polymers. A typical example of a block copolymer is a linear molecular chain having a so-called A—B type di-block copolymer structure—i.e., the main polymer chain (i.e., polymer "backbone") has a structure of —(AA . . . AA)—(BB . . . BB)—, in which the A polymer chain has repeating units A, and the B polymer chain has repeating units B, which are chemically bonded at their terminal ends to each other. A block copolymer may also have three or more types of polymer "blocks" in the main chain. A tri-block copolymer may be of the A—B—A type, B—A—B type or A—B—C type, where "A", "B", and "C" represent polymer chains composed of A repeating units, B repeating units, and C repeating units, whose terminal ends are chemically bonded to each other. Block copolymers may also have the form of a star-type molecular chain, in which the same or different polymer blocks extend radially outward from a central molecular fragment (i.e., a polyvalent atom or molecule). Block copolymers comprising 4 or more blocks, for example (A—B—A)$_n$ type or (A—B)$_n$ type block copolymers may also be used. In addition to those described above, a block copolymer having a polymer chain in which at least one block comprises a random copolymer, for example —(AA . . . AA)—(BCBBBCBCBCB . . . CBB)—, may also be used.

As used herein, the term "graft copolymer" means a copolymer comprising a main backbone chain to which various side chains of another polymer are attached at various points. Several types of polymers can be attached to the main polymer chain as side chains. Graft copolymers are prepared, for example, by reacting a pre-formed polymer with either monomers or a second polymer (or additional polymers), so that the monomers bond to and polymerize from the pre-formed polymer, or the second polymer bonds to the pre-formed polymer, thereby forming a graft polymer which has a main polymer chain (i.e., the preformed polymer) to which side chains (i.e., the polymerized monomer or second polymer chain) are attached. In addition, the graft copolymer may be a combination of a block copolymer and a graft copolymer, in which, for example, a C polymer chain is attached (i.e., grafted) onto a block copolymer, such as an A—B type, A—B—A type or B—A—B type block copolymer.

As used herein, the term "continuous phase" is used to describe a predominant component of a polymeric material, which component may, for example, form the matrix domain of the polymeric material.

As used herein, the term "discontinuous phase" is used to describe a minority component of a polymeric material, which component may, for example, form a microphase-separated discrete domain of the polymeric material.

As used herein, the term "dielectric constant" refers to its meaning as understood by those skilled in the art and provides an index of ability to attenuate the transmission of an electrostatic force from one charged body to another.

As used herein, the term "glass transition temperature ($T_g$)" refers to its meaning as understood by those skilled in the art and relates to the temperature at which an amorphous material changes from a brittle vitreous state to a plastic state.

According to other embodiments of the present invention, methods of forming a polymeric structure having a plurality of cells therein include contacting a polymeric material that includes a first phase that comprises a first polymer, and a second phase that comprises a second polymer, with a composition comprising carbon dioxide and a chemical decomposition agent to remove the second polymer from the polymeric material to form the polymeric structure having a plurality of cells therein.

The polymeric structure has a plurality of cells. Preferably, the plurality of cells comprises closed cells. For example, at least 25, 30, 35, 40, 45, 50, 55, 60, 65, 70, or 75 percent of the cells in the plurality of cells may be closed cells. More preferably, at least 80, 85, 90, or 95 percent of the cells in the plurality of cells are closed cells. Still more preferably, the plurality of cells is a plurality of closed cells. The cells in the plurality of cells preferably have an average diameter from about a lower limit of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or 49 nm to an upper limit of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm. The cells in the plurality of cells more preferably have an average diameter from about 2 to 20 nm. The cells in the plurality of cells still more preferably have an average diameter from about 5 to 10 nm. The density of the plurality of cells is preferably at least 0.2 g/cm$^3$ of polymeric material. The density of the plurality of cells is preferably from about a lower limit of 0.1, 0.2, 0.3, 0.4, 0.5, 0.6, 0.7, 0.8, or 0.9 g/cm$^3$ of polymeric material to an upper limit of 0.2, 0.3, 0.4, 0.5, 0.6, 0.7, 0.8, 0.9, or 1 g/cm$^3$ of polymeric material. Still more preferably, the density of the plurality of cells is preferably from about 0.7 to 0.9 g/cm$^3$ of polymeric material. Preferably the cells in the plurality of cells are discrete as opposed to bicontinuous.

The first phase is preferably a continuous phase, although it will be understood that various other phase morphologies may be acceptable. The continuous phase is preferably between about a lower limit of 51, 52, 53, 54, 55, 56, 57, 58, 58, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 and an upper limit of 52, 53, 54, 55, 56, 57, 58, 58, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent of the polymeric material. The continuous phase is more preferably between about 70 and 95 weight percent of the polymeric material. The continuous phase is still more preferably between about 75 and 90 weight percent of the polymeric material.

The second phase is preferably a discontinuous phase, although it will be understood that other phase morphologies may be acceptable. The discontinuous phase is preferably between about a lower limit of 0.1, 1, 2, 3, 4, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, or 39 and an upper limit of 2, 3, 4, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 weight percent of the polymeric material. The discontinuous phase is more preferably between about 5 and 25 weight percent of the polymeric material. The discontinuous phase is still more preferably between about 10 and 20 weight percent of the polymeric material.

The first phase may comprise various polymers that are not substantially soluble in carbon dioxide as will be understood by those skilled in the art. Preferably, the first phase comprises a first polymer that has a low dielectric constant. The polymer having a low dielectric constant may be various polymers having low dielectric constants as will be understood by those skilled in the art including, but not limited to, the polystyrenes, polyimides, polybutylenes, acrylic resins, fluoropolymers, poly(arylene)ethers, polyphenylenes, SiLK™ resins, poly(benzoxazole) polymers, poly(phenylquinoxazole) polymers, poly (quinoline) polymers, polynorbornenes, benzocyclobutene resins, poly(perfluorocyclobutane) polymers, perfluorinated aliphatic polymers, various polymers described in G. Maier, "Low Dielectric Constant Polymers for Microelectronics," *Prog. Polym. Sci.* 26: 3–65 (2001), the disclosure of which is incorporated herein by reference in its entirety, and mixtures and/or combinations thereof.

Preferably, the first polymer has a degree of polymerization from about 200 to 1500. More preferably, the first polymer has a degree of polymerization from about 400 to 1100. Still more preferably, the first polymer has a degree of polymerization from about 700 to 900. In some embodiments, the first polymer may have a glass transition temperature ($T_g$) between about 50° C. and 200° C., more preferably between about 50° C. and 125° C.

The polystyrenes may be various polystyrenes as will be understood by those skilled in the art, including but not limited to, polystyrene and polystyrene substituted at the α position with alkyl such as methyl, ethyl, propyl, butyl, etc.

The polyimides may be various polyimides as will be understood by those skilled in the art, including but not limited to, polybenzimide and polyimides described C. E. Sroog, *Progr. Polym. Sci.*, 16: 561 (1991), the disclosure of which is incorporated herein by reference in its entirety.

The polybutylenes may be various polybutylenes as will be understood by those skilled in the art, including but not limited to, polyisobutylene, polysecbutylene, polytertbutylene, polyphenylbutylene, polyisoprene and polychloroprene.

Acrylic resins may be various acrylic resins as will be understood by those skilled in the art, including but not limited to, acrylates such as alkylacrylates, hydroxyalkyl acrylates, and/or glycidyl acrylates, and methacrylates such as alkylmethacrylates, hydroxyalkyl methacrylates, glycidyl methacrylate. Alkylacrylates include, but are not limited to, methylacrylate, ethylacrylate, isobutylacrylate, secbutylacrylate, tertbutylacrylate, and 2-ethylhexylacrylate. Methacrylates include, but are not limited to, methyl methacrylate, ethyl methacrylate, isobutyl methacrylate, secbutyl methacrylate, and tertbutyl methacrylate. Hydroxyalkylacrylates include, but are not limited to, hydroxyethyl acrylate, hydroxypropyl acrylate, and hydroxybutyl acrylate. Hydroxyalkyl methacrylates include, but are not limited to, hydroxyethyl methacrylate, hydroxypropyl methacrylate, hydroxybutyl methacrylate, 3-chloro-2-hydroxybutyl methacrylate, and n-propyl methacrylate.

The fluoropolymers may be various fluoropolymers as will be understood by those skilled in the art including, but not limited to, polyvinylidene fluoride, polyvinyl fluoride, polytetrafluoroethylene, polychlorotrifluoroethylene, polyhexafluoroisobutylene, and the fluoropolymers described in U.S. Pat. No. 5,674,957 to DeSimone et al., the disclosure of which is incorporated herein by reference in its entirety.

SiLK™ resins include SiLK™ resin, SiLK™ I resin, SiLK™ H resin and CYCLOTENE™ resin. The SiLK™ family of resins are made commercially available from The Dow Chemical Company located in Midland, Mich.

The fluorinated poly(arylene ether) polymers may be various poly(arylene ether) polymers as will be understood by those skilled in the art including, but not limited to, FLARE 1.0 and FLARE 2.01 commercially available from Allied Signal.

The polynorbornenes may be various polynorbornenes as will be understood by those skilled in the art including, but not limited to, poly(alkylnorbonene) and poly(alkoxysilyl norbornene).

The second phase comprises a second polymer that is soluble in carbon dioxide as will be understood by those skilled in the art including, but not limited to, polydimethylsiloxane (PDMS), perfluoropolyethers, poly(butene sulfones), poly(alkylene carbonates), polyethylene glycols, and mixtures and/or combinations thereof. The second polymer preferably has a degree of polymerization from about 10 to 80. More preferably, the second polymer has a degree of polymerization from about 20 to 60. Still more preferably, the second polymer has a degree of polymerization from about 30 to 50. In some embodiments, the second polymer may have a $T_g$ between about −50° C. to −200° C., more preferably between about −75° C. to −150° C.

The composition employed to contact the polymeric material comprises carbon dioxide and a chemical decomposition agent. The carbon dioxide may be supercritical carbon dioxide, liquid carbon dioxide, gaseous carbon dioxide or an appropriate mixture thereof. The carbon dioxide is preferably supercritical carbon dioxide (scCO$_2$). In particular, the methods of the present invention are preferably carried out at a temperature range preferably from about 0° C. to 80° C., more preferably from 15° C. to 60° C., and still more preferred from about 25° C. to 35° C. The pressures employed preferably range from about 1100 psia (7.6 MPa) to about 4000 psia (27.6 MPa). The amount of carbon dioxide in the composition is preferably from about a lower limit of 1, 2, 3, 4, 5, 6, 7, 8, 9, 10, 11, 12, 13, 14, 15, 16, 17, 18, 19, 20, 21, 22, 23, or 24 to an upper limit of 2, 3, 4, 5, 6, 7, 8, 9, 10, 11, 12, 13, 14, 15, 16, 17, 18, 19, 20, 21, 22, 23, 24, or 25 percent by volume of the composition (v/v). The amount of carbon dioxide in the composition is preferable 1 to 20 volume percent, more preferably 1 to 10 volume percent, and still more preferably 3 to 8 volume percent. Contacting the polymeric material with the composition comprising carbon dioxide and the chemical decomposition agent removes the second polymer from the polymeric material to form the polymeric structure having a plurality of cells therein. In some embodiments, contacting the polymeric material with the composition comprising carbon dioxide and the chemical decomposition agent removes the second phase (e.g., when the second phases consists of the second polymer) from the polymeric material to form the polymeric structure having a plurality of cells therein.

The chemical decomposition agent may be various chemical decomposition agents as will be understood by those skilled in the art including but not limited to, acids and bases. The chemical decomposition agent is preferably soluble in carbon dioxide. Acids are preferably halogen-containing acids, and are more preferably fluorine-containing acids. More preferably, the acid is trifluoroacetic acid, trifluoromethylsulfonic acid, or mixtures thereof.

In some embodiments, the composition consists essentially of carbon dioxide and one or more chemical decomposition agents. In other embodiments, the composition consists of carbon dioxide and one or more chemical decomposition agents.

The composition comprising carbon dioxide and a chemical decomposition agent may comprise other agents as will be understood by those skilled in the art including, but not limited to, surfactants, co-solvents, and standard gases other than carbon dioxide used as supercritical solvents such as nitrogen.

The surfactants may be various surfactants as will be understood by those skilled in the art including, but not limited to, those set forth in U.S. Pat. Nos. 5,783,082; 5,589,105; 5,639,836; and 5,451,633 all to DeSimone et al.; and U.S. Pat. Nos. 5,676,705; and 5,683,977 both to Jureller et al., the disclosures of which are incorporated herein by reference in their entirety.

Co-solvents that may be used in the composition comprising carbon dioxide include both polar and non-polar, protic and aprotic solvents, such as water and organic co-solvents. Organic co-solvents include, but are not limited to, aliphatic and aromatic hydrocarbons, and esters and ethers thereof, particularly mono and di-esters and ethers (e.g., EXXON ISOPAR L, ISOPAR M, ISOPAR V, EXXON EXXSOL, EXXON DF 2000, CONDEA VISTA LPA-170N, CONDEA VISTA LPA-210, cyclohexanone, and dimethyl succinate), alkyl and dialkyl carbonates (e.g., dimethyl carbonate, dibutyl carbonate, di-t-butyl dicarbonate, ethylene carbonate, and propylene carbonate), alkylene and polyalkylene glycols, and ethers and esters thereof (e.g., ethylene glycol-n-butyl ether, diethylene glycol-n-butyl ethers, propylene glycol methyl ether, dipropylene glycol methyl ether, tripropylene glycol methyl ether, and dipropylene glycol methyl ether acetate), lactones (e.g., (gamma)butyrolactone, (epsiglon)caprolactone, and (delta) dodecanolactone), alcohols and diols (e.g., 2-propanol, 2-methyl-2-propanol, 2-methoxy-2-propanol, 1-octanol, 2-ethyl hexanol, cyclopentanol, 1,3-propanediol, 2,3-butanediol, 2-methyl-2,4-pentanediol) and polydimethylsiloxanes (e.g., decamethyltetrasiloxane, decamethylpentasiloxane, and hexamethyldisloxane), DMSO, mineral oil, terpenes such as limonene, vegetable and/or plant oils such as soy or corn oil, derivatives of vegetable oils such as methyl soyate, NMP, halogenated alkanes (e.g., hydrochlorofluorocarbons, perfluorocarbons, brominated alkanes, and chlorofluorocarbons) and alkenes, alcohols, ketones and ether. Mixtures of the above co-solvents may also be used.

The polymeric structure may have a low dielectric constant. The dielectric constant preferably has a range from about a lower limit of 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, and 3.4 to and upper limit of 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, and 3.5. More preferably, the dielectric constant has a range from about 1.5 to 2.7. Still more preferably, the dielectric constant has a range from about 1.5 to 2.1.

In some embodiments according to the present invention, the polymeric material includes a copolymer that comprises the first phase and the second phase. While the copolymer comprises the first and the second phase, it is to be understood that the copolymer can have two or more phases. Preferably, the copolymer has 2, 3, 4, or 5 phases. More preferably, the copolymer has 2 or 3 phases, and, still more preferably, the copolymer has two phases.

The first phase of the copolymer is preferably a continuous phase, although it will be understood that various other phase morphologies may be acceptable. The continuous phase is preferably between about a lower limit of 51, 52, 53, 54, 55, 56, 57, 58, 58, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 and an upper limit of 52, 53, 54, 55, 56, 57, 58, 58, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent of the copolymer. The continuous phase is more preferably between about 70 and 95 weight percent of the copolymer. The continuous phase is still more preferably between about 75 and 90 weight percent of the copolymer.

The second phase is preferably a discontinuous phase, although it will be understood that other phase morphologies may be acceptable. The discontinuous phase is preferably between about a lower limit of 0.1, 1, 2, 3, 4, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, or 39 and an upper limit of 2, 3, 4, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 weight percent of the copolymer. The discontinuous phase is more preferably between about 5 and 25 weight percent of the copolymer. The discontinuous phase is still more preferably between about 10 and 20 weight percent of the copolymer.

The copolymer may be various copolymers as will be understood by those skilled in the art including, but not limited to, block copolymers, graft copolymers, statistical copolymers and random copolymers.

Exemplary block copolymers include, but are not limited to, poly(styrene-b-ethylene oxide-b-dimethylsiloxane) [PS-b-PDMS], polystyrene-b-poly(1,1-dihydroperfluorooctyl acrylate), polymethyl methacrylate-b-poly(1,1-dihydroperfluorooctyl methacrylate), poly(2-(dimethylamino)ethyl methacrylate)-b-poly(1,1-dihydroperfluorooctyl methacrylate), a diblock copolymer of poly(2-hydroxyethyl methacrylate) and poly(1,1-dihydroperfluorooctyl methacrylate), and mixtures thereof. The block copolymer is preferably poly(styrene-b-ethylene oxide-b-dimethylsiloxane).

Exemplary graft copolymers include, but are not limited to polystyrene-g-polydimethylsiloxane, poly(methyl acrylate-g-1,1'dihydroperfluorooctyl methacrylate), poly(1, 1'-dihydroperfluorooctyl acrylate-g-styrene), and mixtures thereof. The graft copolymer is preferably polystyrene-g-polydimethylsiloxane (PS-g-PDMS).

Exemplary statistical copolymers include, but are not limited to, poly(1,1-dihydroperfluoro octyl acrylate) and polystyrene, along with poly(1,1-dihydroperfluorooctyl methacrylate) and poly(2-hydroxyethyl methacrylate).

Exemplary random copolymers include, but are not limited to, copolymers or terpolymers of tetrafluoroethylene, vinylidene fluoride, hexafluoropropylene, chlorotrifluoroethylene, and ethylene.

Copolymers according to embodiments of the present invention may be synthesized by various methods as will be understood by those skilled in the art. For example, copolymers may be synthesized by methods described in George Odian, *Principles of Polymerization*, John Wiley & Sons, Inc., New York (3rd ed. 1991), which is incorporated herein by reference in its entirety, and/or by methods described in R. J. Young and P. A. Lovell, *Introduction to Polymers*, 115–133, Stanley Thornes (Publishers) Ltd, United Kingdom (2nd ed. 2000), pages 115–133 being incorporated herein by reference in their entireties. Preferred copolymers may be synthesized by methods according to embodiments of the present invention as described in Examples 1 through 3 below.

According to other embodiments of the present invention, methods of forming a polymeric structure having a plurality of cells therein where the cells in the plurality of cells have an average diameter of from about 1 to 25 nm are provided. The methods include contacting a polymeric material that includes a first phase that comprises a first polymer, and a second phase that comprises a second polymer, with a composition comprising carbon dioxide to remove the second polymer from the polymeric material to form the polymeric structure having a plurality of cells therein where the cells in the plurality of cells have an average diameter of from about 1 to 25 mm.

As described above, the polymeric material may comprise a copolymer that comprises the first phase and the second phase. The polymeric material may have a low dielectric constant as described above. The first phase, the first polymer, the second phase, and the second polymer are similar to first phase, the first polymer, the second phase, and/or the second polymer described above, or alternatives may be used.

The polymeric structure has a plurality of cells. Preferably, the plurality of cells comprises closed cells. For example, at least 25, 30, 35, 40, 45, 50, 55, 60, 65, 70, or 75 percent of the cells in the plurality of cells may be closed cells. More preferably, at least 80, 85, 90, or 95 percent of the cells in the plurality of cells are closed cells. Still more preferably, the plurality of cells is a plurality of closed cells. The cells in the plurality of cells have an average diameter from about a lower limit of 1, 2, 3, 4, 5, 6, 7, 8, 9, 10, 11, 12, 13, 14, 15, 16, 17, 18, 19, 20, 21, 22, 23, or 24 nm to an upper limit of 2, 3, 4, 5, 6, 7, 8, 9, 10, 11, 12, 13, 14, 15, 16, 17, 18, 19, 20, 21, 22, 23, 24, or 25 nm. The cells in the plurality of cells preferably have an average diameter from about 2 to 20 nm. The cells in the plurality of cells more preferably have an average diameter from about 5 to 10 nm. Still more preferably, the cells in the plurality of cells have an average diameter from about 5 to 8 nm. The density of the plurality of cells is preferably at least 0.2 g/cm$^3$ of polymeric material. The density of the plurality of cells is preferably from about a lower limit of 0.1, 0.2, 0.3, 0.4, 0.5, 0.6, 0.7, 0.8, or 0.9 g/cm$^3$ of polymeric material to an upper limit of 0.2, 0.3, 0.4, 0.5, 0.6, 0.7, 0.8, 0.9, or 1 g/cm$^3$ of polymeric material. Still more preferably, the density of the plurality of cells is preferably from about 0.7 to 0.9 g/cm$^3$ of polymeric material. Preferably the cells in the plurality of cells are discrete as opposed to bicontinuous.

The composition employed to contact the polymeric material comprises carbon dioxide. The carbon dioxide may be supercritical carbon dioxide, liquid carbon dioxide, gaseous carbon dioxide or an appropriate mixture thereof. The carbon dioxide is preferably supercritical carbon dioxide (scCO$_2$). In particular, the methods of the present invention are preferably carried out at a temperature range preferably from about 0° C. to 80° C., more preferably from 15° C. to 60° C., and still more preferred from about 25° C. to 35° C. The pressures employed preferably range from about 1100 psia (7.6 MPa) to about 4000 psia (27.6 MPa). Contacting the polymeric material with the composition comprising carbon dioxide removes the second polymer from the polymeric material to form the polymeric structure having a plurality of cells therein. In some embodiments, contacting the polymeric material with the composition comprising carbon dioxide removes the second phase (e.g., when the second phases consists of the second polymer) from the polymeric material to form the polymeric structure having a plurality of cells therein.

The composition comprising carbon dioxide may comprise other agents as will be understood by those skilled in the art including, but not limited to, chemical decomposition agents, surfactants, co-solvents, and standard gases other than carbon dioxide used as supercritical solvents such as nitrogen. The chemical decomposition agents, surfactants, co-solvents, and/or standard gases may be similar to those described above or alternatives may be used. When the composition comprising carbon dioxide comprises one or more other agents, the amount of carbon dioxide in the composition is preferably from about a lower limit of 1, 2, 3, 4, 5, 6, 7, 8, 9, 10, 11, 12, 13, 14, 15, 16, 17, 18, 19, 20, 21, 22, 23, or 24 to an upper limit of 2, 3, 4, 5, 6, 7, 8, 9, 10, 11, 12, 13, 14, 15, 16, 17, 18, 19, 20, 21, 22, 23, 24, or 25 percent by volume of the composition (v/v). The amount of carbon dioxide in the composition is preferable 1 to 20 volume percent, more preferably 1 to 10 volume percent, and still more preferably 3 to 8 volume percent.

According to still other embodiments of the present invention, methods of forming a polymeric structure having a plurality of cells therein where the polymeric structure has a dielectric constant of from about 1.5 to 3.5 are provided. The methods include contacting a polymeric material including a first phase that comprises a first polymer, and a second phase that comprises a second polymer, with a composition comprising carbon dioxide to remove the second polymer from the polymeric material to form the polymeric structure having a plurality of cells therein where the polymeric structure has a dielectric constant of from about 1.5 to 3.5.

As described above, the polymeric material may comprise a copolymer that comprises the first phase and the second phase. The first phase, first polymer, second phase, and/or second polymer may be similar to those described above, or alternatives may be used.

The dielectric constant has a range from about a lower limit of 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, and 3.4 to and upper limit of 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, and 3.5. More preferably, the dielectric constant has a range from about 1.5 to 2.7. Still more preferably, the dielectric constant has a range from about 1.5 to 2.1.

The polymeric structure has a plurality of cells. Preferably, the plurality of cells comprises closed cells. For example, at least 25, 30, 35, 40, 45, 50, 55, 60, 65, 70, or 75 percent of the cells in the plurality of cells may be closed cells. More preferably, at least 80, 85, 90, or 95 percent of the cells in the plurality of cells are closed cells. Still more preferably, the plurality of cells is a plurality of closed cells. The cells in the plurality of cells preferably have an average diameter from about a lower limit of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or 49 nm to an upper limit of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm. The cells in the plurality of cells more preferably have an average diameter from about 2 to 20 nm. The cells in the plurality of cells still more preferably have an average diameter from about 5 to 10 nm. The density of the plurality of cells is preferably at least 0.2 g/cm$^3$ of polymeric material. The density of the plurality of cells is preferably from about a lower limit of 0.1, 0.2, 0.3, 0.4, 0.5, 0.6, 0.7, 0.8, or 0.9 g/cm$^3$ of polymeric material to an upper limit of 0.2, 0.3, 0.4, 0.5, 0.6, 0.7, 0.8, 0.9, or 1 g/cm$^3$ of polymeric material. Still more preferably, the density of the plurality of cells is preferably from about 0.7 to 0.9 g/cm$^3$ of polymeric material. Preferably the cells in the plurality of cells are discrete as opposed to bicontinuous.

The composition employed to contact the polymeric material comprises carbon dioxide. The carbon dioxide may be supercritical carbon dioxide, liquid carbon dioxide, gaseous carbon dioxide or an appropriate mixture thereof. The carbon dioxide is preferably supercritical carbon dioxide (scCO$_2$). In particular, the methods of the present invention are preferably carried out at a temperature range preferably from about 0° C. to 80° C., more preferably from 15° C. to 60° C., and still more preferred from about 25° C. to 35° C. The pressures employed preferably range from about 1100 psia (7.6 MPa) to about 4000 psia (27.6 MPa). Contacting the polymeric material with the composition comprising carbon dioxide removes the second polymer from the polymeric material to form the polymeric structure having a plurality of cells therein. In some embodiments, contacting the polymeric material with the composition comprising carbon dioxide removes the second phase (e.g., when the second phases consists of the second polymer) from the polymeric material to form the polymeric structure having a plurality of cells therein.

The composition comprising carbon dioxide may comprise other agents as will be understood by those skilled in the art including, but not limited to, chemical decomposition agents, surfactants, co-solvents, and standard gases other than carbon dioxide used as supercritical solvents such as nitrogen. The chemical decomposition agents, surfactants, co-solvents, and/or standard gases may be similar to those described above or alternatives may be used. When the composition comprising carbon dioxide comprises one or more other agents, the amount of carbon dioxide in the composition is preferably from about a lower limit of 1, 2, 3, 4, 5, 6, 7, 8, 9, 10, 11, 12, 13, 14, 15, 16, 17, 18, 19, 20, 21, 22, 23, or 24 to an upper limit of 2, 3, 4, 5, 6, 7, 8, 9, 10, 11, 12, 13, 14, 15, 16, 17, 18, 19, 20, 21, 22, 23, 24, or 25 percent by volume of the composition (v/v). The amount of carbon dioxide in the composition is preferable 1 to 20 volume percent, more preferably 1 to 10 volume percent, and still more preferably 3 to 8 volume percent.

According to still other embodiments of the present invention, methods of forming a polymeric film for use as a dielectric material in a microelectronic device include contacting a polymeric material comprising a first phase that includes a first polymer and a second phase that includes a second polymer with a composition comprising carbon dioxide to remove the second polymer from the polymeric material to form the polymeric film for use as a dielectric material in a microelectronic device.

In some embodiments, the polymeric material is formed on a microelectronic substrate prior to the contacting of the polymeric material with the composition. The polymeric material may be formed on a microelectronic substrate by various methods as will be understood by those skilled in the art. The microelectronic substrate may be various microelectronic substrates as will be understood by those skilled in the art and may comprise silicon, for example.

The methods of forming a polymeric film are similar to the methods of forming polymeric structures described above, although it is to be understood that alternative methods may be used. The polymeric film of the polymeric material may be formed by various methods of forming polymeric films as will be understood by those skilled in the art including, but not limited to, spin coating, bulk evaporation, free-meniscus coating, and dip-coating.

According to yet other embodiments of the present invention, polymer structures include a polymeric matrix having a plurality of cells therein where the plurality of cells have an average diameter of from about 1 to 25 nm.

The polymeric structure has a plurality of cells. Preferably, the plurality of cells comprises closed cells. For example, at least 25, 30, 35, 40, 45, 50, 55, 60, 65, 70, or 75 percent of the cells in the plurality of cells may be closed cells. More preferably, at least 80, 85, 90, or 95 percent of the cells in the plurality of cells are closed cells. Still more preferably, the plurality of cells is a plurality of closed cells. The cells in the plurality of cells have an average diameter from about a lower limit of 1, 2, 3, 4, 5, 6, 7, 8, 9, 10, 11, 12, 13, 14, 15, 16, 17, 18, 19, 20, 21, 22, 23, or 24, 25 nm to an upper limit of 2, 3, 4, 5, 6, 7, 8, 9, 10, 11, 12, 13, 14, 15, 16, 17, 18, 19, 20, 21, 22, 23, 24, or 25 nm. The cells in the plurality of cells preferably have an average diameter from about 2 to 20 nm. The cells in the plurality of cells more preferably have an average diameter from about 5 to 10 nm. The density of the plurality of cells is preferably at least 0.2 g/cm$^3$ of polymeric material. The density of the plurality of cells is preferably from about a lower limit of 0.1, 0.2, 0.3, 0.4, 0.5, 0.6, 0.7, 0.8, or 0.9 g/cm$^3$ of polymeric material to an upper limit of 0.2, 0.3, 0.4, 0.5, 0.6, 0.7, 0.8, 0.9, or 1 g/cm$^3$ of polymeric material. Still more preferably, the density of the plurality of cells is preferably from about 0.7 to 0.9 g/cm$^3$ of polymeric material. Preferably the cells in the plurality of cells are discrete as opposed to bicontinuous.

The polymeric structure is preferably formed by methods according to embodiments of the present invention described above, although it will be understood that alternative methods may be used.

According to yet other embodiments of the present invention, microelectronic devices include a dielectric material that comprises a polymeric matrix having a plurality of cells therein where the plurality of cells have an average diameter of from about 1 to 25 nm.

The polymeric matrix preferably comprises a polymer having a low dielectric constant as described above.

The dielectric material preferably has a low dielectric constant. The dielectric constant preferably has a range from about a lower limit of 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, and 3.4 to and upper limit of 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, and 3.5. While some of the values described for the lower limit are higher than some of the values described for the lower limit, it is to be understood that when selecting a given range of values, the lower limit selected will be lower than the upper limit selected. More preferably, the dielectric constant has a range from about 1.5 to 2.7. Still more preferably, the dielectric constant has a range from about 1.5 to 2.1.

The polymeric matrix has a plurality of cells. Preferably, the plurality of cells comprises closed cells. For example, at least 25, 30, 35, 40, 45, 50, 55, 60, 65, 70, or 75 percent of the cells in the plurality of cells may be closed cells. More preferably, at least 80, 85, 90, or 95 percent of the cells in the plurality of cells are closed cells. Still more preferably, the plurality of cells is a plurality of closed cells. The cells in the plurality of cells have an average diameter from about a lower limit of 1, 2, 3, 4, 5, 6, 7, 8, 9, 10, 11, 12, 13, 14, 15, 16, 17, 18, 19, 20, 21, 22, 23, or 24 nm to an upper limit of 2, 3, 4, 5, 6, 7, 8, 9, 10, 11, 12, 13, 14, 15, 16, 17, 18, 19, 20, 21, 22, 23, 24, or 25 nm. The cells in the plurality of cells preferably have an average diameter from about 2 to 20 nm. The cells in the plurality of cells more preferably have an average diameter from about 5 to 10 mm. The density of the plurality of cells is preferably at least 0.2 g/cm$^3$ of polymeric material. The density of the plurality of cells is preferably from about a lower limit of 0.1, 0.2, 0.3, 0.4, 0.5, 0.6, 0.7, 0.8, or 0.9 g/cm$^3$ of polymeric material to an upper limit of 0.2, 0.3, 0.4, 0.5, 0.6, 0.7, 0.8, 0.9, or 1 g/cm$^3$ of polymeric material. While some of the values described for the lower limit are higher than some of the values described for the lower limit, it is to be understood that when selecting a given range of values, the lower limit selected will be lower than the upper limit selected. Still more preferably, the density of the plurality of cells is preferably from about 0.7 to 0.9 g/cm$^3$ of polymeric material. Preferably the cells in the plurality of cells are discrete as opposed to bicontinuous.

The microelectronic devices according to these embodiments of the present invention may be formed by employing various methods of forming microelectronic devices as will be understood by those skilled in the art in combination with the methods according to embodiments of the present invention described above, although it will be understood that the microelectronic devices may be formed by alternative methods.

The invention will now be described further with respect to the foregoing examples. It should be appreciated that these examples are for the purpose of illustrating the invention, and do not limit the scope of the invention as defined by the claims.

EXAMPLE 1

Preparation of Materials

Monomethacrylate-terminated polydimethylsiloxane macromonomer (MA-PDMS Aldrich, Mw=10,000 g/mol) and styrene were purified and deinhibited by passage through an alumina column and were deoxygenated by argon purge prior to use. Hexamethylcyclotrisiloxane (D$_3$) was purchased from Acros and was purified via vacuum sublimation. 2,2'-Azobisisobutyronitrile (AIBN, Aldrich) was crystallized twice from methanol. sec-Butyllithium (1.3 M in cyclohexane, Aldrich) was used as received. Cyclohexane was stirred over concentrated sulfuric acid for approximately 2 weeks, decanted, and distilled over sodium under an argon atmosphere prior to use. Tetrahydrofuran (THF) was distilled from sodium/benzophenone under an argon atmosphere prior to use. Heptane and methanol were used as received. Carbon dioxide (SFC/SFE Grade with or without a helium head pressure) was kindly provided by Air Products and was used as received.

EXAMPLE 2

Synthesis of PS-b-PDMS Block Copolymers

Figure 2:
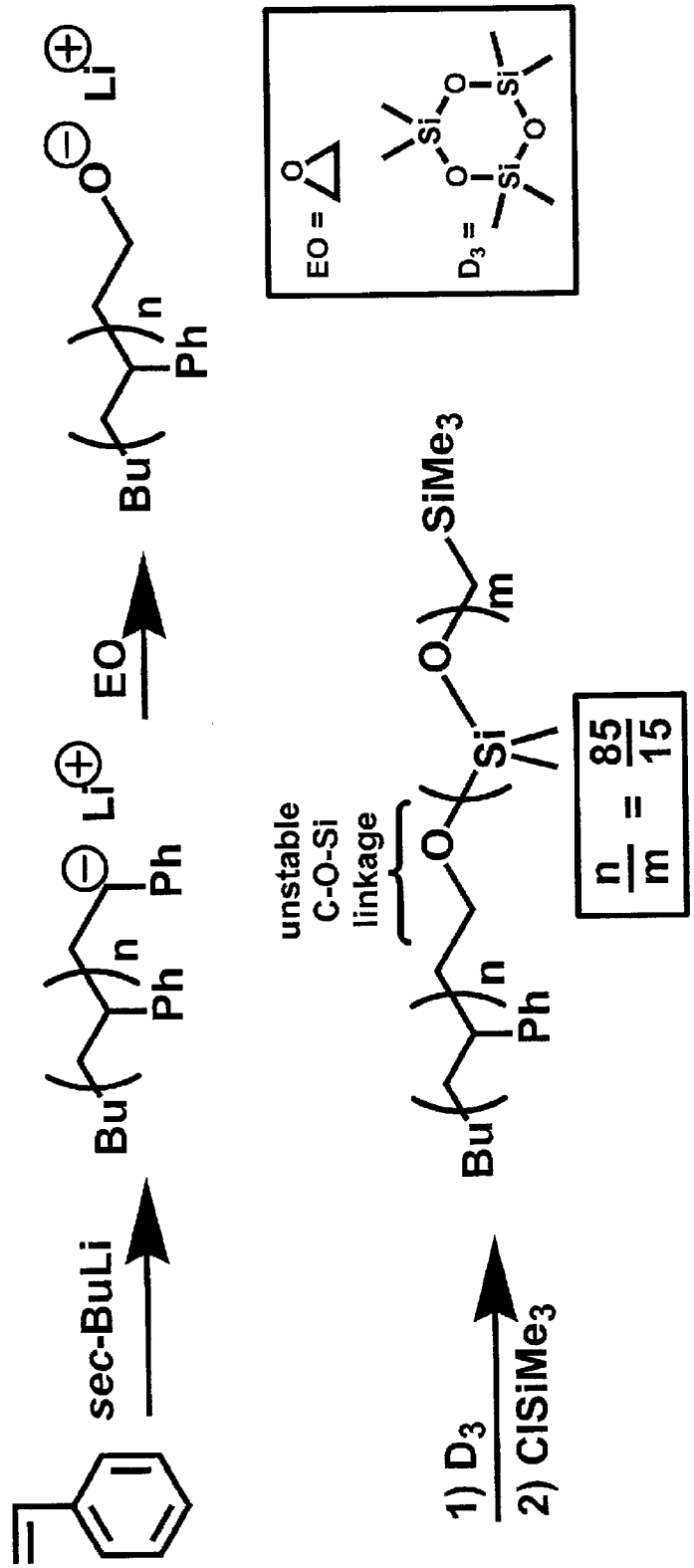
FIG. 2 illustrates a synthetic scheme for the synthesis of poly(styrene-b-ethylene oxide-b-dimethylsiloxane) according to embodiments of the present invention.

PS-b-PDMS was synthesized via living anionic polymerization methods through sequential monomer addition as illustrated in FIG. 2. This method involves stepwise anionic polymerization of styrene, ethylene oxide (EO) and D$_3$ to form PS-b-PDMS copolymer. The readily cleavable C—O—Si linker was added via anionic polymerization of EO as a second step before addition of D$_3$. The polymer was collected by precipitation into hexane. It was not precipitated into methanol due to concern that the C—O—Si linkage might cleave.

The molecular weights of the PS first blocks were determined by withdrawing a sample of the living PS anion prior to the addition of the ethylene oxide and then prior to the addition of the D$_3$, followed by quenching of the aliquot with methanol. The polymer was precipitated into methanol to purify.

The molecular weights of the copolymers were determined using gas permeation chromatography (GPC), and the glass transition temperature ($T_g$) and melting point ($T_m$) were determined using differential scanning calorimetry (DSC). Bulk films were prepared by evaporation of a chloroform solution of the polymer in a 20 mL scintillation vial. Transition electron micrographs were obtained at 380,000× magnification. The PDMS resonances in the nuclear magnetic resonance spectroscopy ($^1$H NMR) spectrum were observed at 0.05 ppm. The styrenyl aliphatic protons were observed at 1.24 ppm and 1.94 ppm as broad resonances and the aromatic resonances were observed at 6.47 ppm, 6.55 ppm and 6.91 ppm as broad resonances. The EO resonances were observed at 1.25 ppm. The ratio of PS:PDMS was determined via $^1$H NMR spectroscopy to be 9:1. By DSC, a $T_g$ for PS was observed at 73.2° C., and a $T_g$ and $T_m$ for the PDMS at −124.7° C. and −53.9° C., respectively. The molecular weight for the first sample was found to be 21,900 g/mol based on GPC data.

The product yield for this process was 65%. The PS-b-PDMS polymer produced had a PDMS content of 13% and a total molecular weight of 16,400.

EXAMPLE 3

Synthesis of PS-g-PDMS Graft Copolymers

Figure 3:
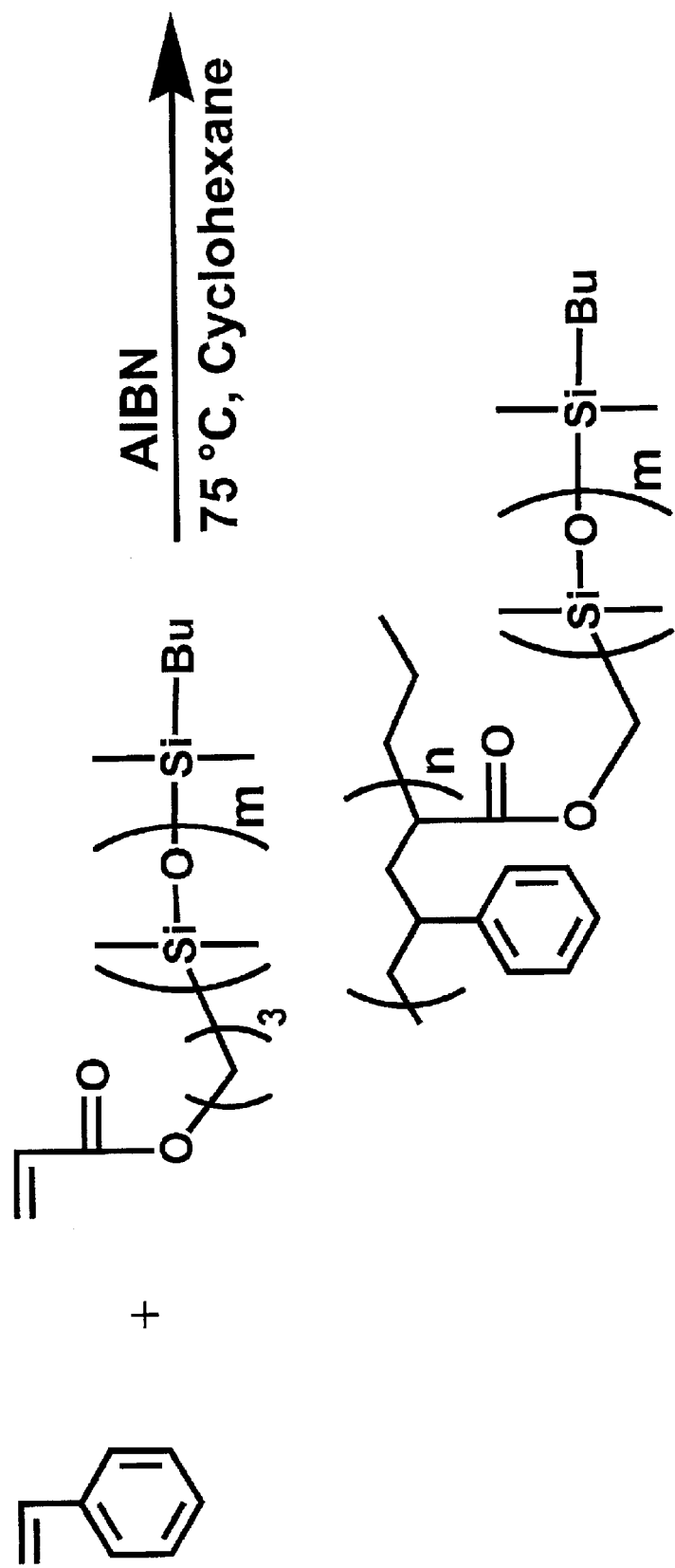
FIG. 3 illustrates a synthetic scheme for the synthesis of polystyrene-g-polydimethylsiloxane according to embodiments of the present invention.

PS-g-PDMS copolymers of varying wt % PDMS were synthesized via radical polymerization methods from deinhibited styrene and MA-PDMS, using AIBN as the initiator as shown in FIG. 3. The molecular weights were from ca. 50K g/mol to 78K g/mol. For a sample PS-g-PDMS (15 wt %) copolymer, $T_g$s of 86.5° C. (PS) and −106.2° C. (PDMS) were observed along with a $T_m$ of −45.8° C. Theses values are consistent with the expected values based on $T_g$ and $T_m$ of homopolymeric PS and PDMS. By $^1$H NMR spectroscopy, resonances corresponding to the PDMS methyl groups were observed at δ 0.40 ppm. Aromatic resonances for the styrenyl protons were observed at 1.64 and 2.14 ppm as broad singlets for the aliphatic region and at δ6.67 ppm, 6.77 ppm and 7.12 ppm as broad singlets for the aromatic region. Integration of these peaks gives the PS to PDMS ratio in the polymer. The $^{29}$Si NMR spectra show singlets for the silicon atoms in the polymer backbone at δ−21.6 ppm. Purification of the copolymer required removal of unreacted PDMS macromonomer with cold hexane. (Soxhlet extraction with hot solvent resulted in dissolution of the copolymer.)

The results from the synthesis of the PS-g-PDMS copolymers are summarized in Table 1.

TABLE 1

Yields and polydispersity of PS-g-PDMS copolymers. PDMS content is from 5–25 wt %.

| Entry | PDMS wt % | Yield | Mw (GPC) | PDI | $^{29}$Si NMR |
|---|---|---|---|---|---|
| 1 | 5 | 44 | 69,700 | 1.54 | — |
| 2 | 10 | 56 | 79,000 | 4.64 | −23.3 |
| 3 | 15 | 46 | 66,800 | 1.18 | −21.7 |
| 4 | 20 | 67 | 71,000 | 1.54 | — |
| 5 | 25 | 68 | 55,900 | 1.59 | — |

EXAMPLE 4

Phase Removal from Copolymers with scCO$_2$

A sample run is described here. The PS-g-PDMS powder (or film) was placed into a high pressure cell with H$_2$O (2 mL) and the cell sealed. The cell was pressurized to 1000 psi and heating begun. Once the temperature reached 35° C., the cell was pressurized further to the desired pressure (ca. 3800 psi). The reaction was stirred for 18 to 36 h after which the heat was turned off, the cell cooled to room temp and the pressure vented. The CO$_2$/H$_2$O emulsion results in a lowered pH. The resulting powder (or film) was analyzed by GPC and $^1$H NMR spectroscopy to determine % removal of PDMS.

Reactions of the polymer powder in solution show removal of the PDMS from the copolymer. A similar result is seen in the reaction of polymer powder in scCO$_2$. The block copolymers are not soluble in scCO2, and the reaction occurred in suspension form. After the reaction, GPC showed a change in Mw. In the case of PS-g-PDMS (10 wt %) powder sample, the molecular weight dropped from 64K g/mol before the reaction to 58 K g/mol after reaction with acidic CO$_2$. A similar reaction using a bulk film sample of PS-g-PDMS (15 wt %) also showed a decrease in molecular weight, although the change was only ca. 5% and not the full 15% expected if all the PDMS was removed. Upon cooling and venting the cell, the filmed which was removed from the cell had gone from clear to opaque. This is possibly due to foaming of the film upon rapid venting of the CO$_2$. The decrease in molecular weight is consistent with the idea that the PDMS was cleaved and removed. The small Mw drop may be due to lack of time for the PDMS to diffuse out of the polymer. In all cases, the copolymers (graft or block) were found to be insoluble in scCO$_2$.

EXAMPLE 5

Polymer Films

Figure 4:
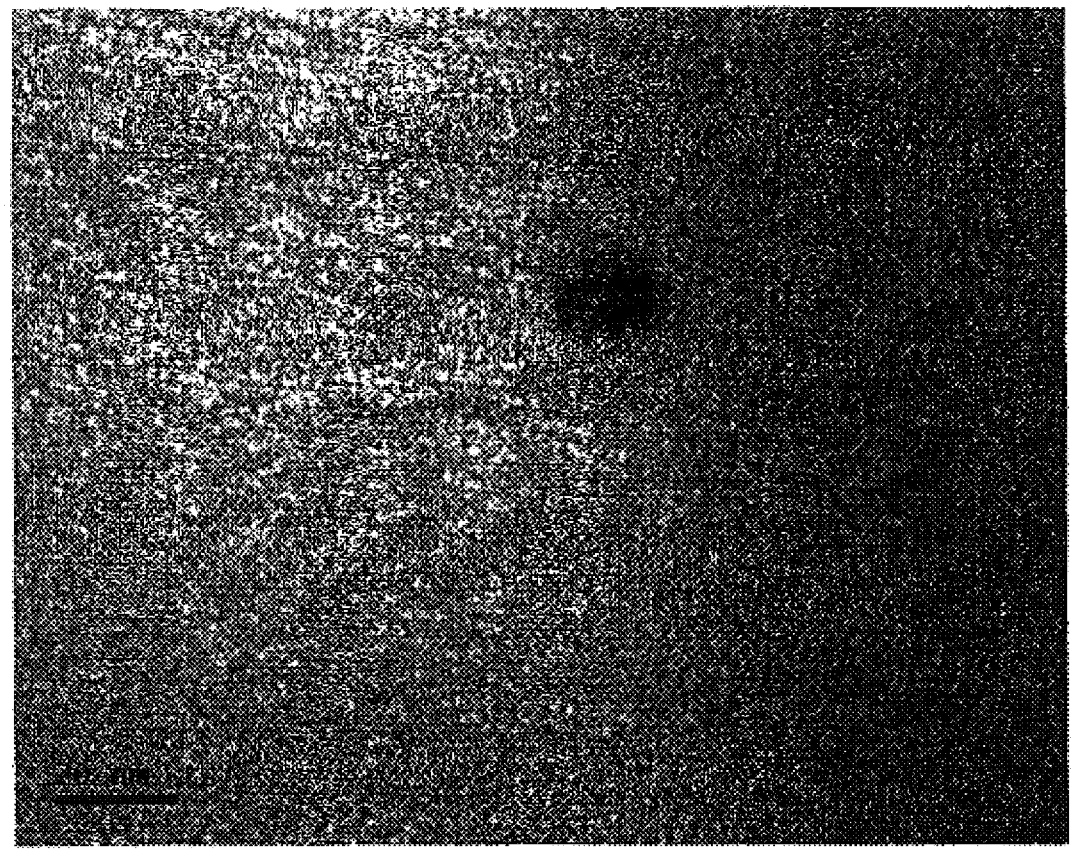
FIG. 4 illustrates Transmission electron microscopy (TEM) at 380,000 magnification of polydimethylsiloxane spheres in a polystyrene matrix according to embodiments of the present invention.

Evaporation of solutions of PS-g-PDMS and PS-b-PDMS in chloroform resulted in clear films. A sample of these films was evaluated to determine the nanoscopic morphology. The Transmission electron microscopy (TEM) pictures (shown in FIG. 4) show the spheres in a matrix morphology that was expected based on the weight % of the PDMS grafts relative to the PS molecular weight. The spheres are approx 5–8 nm diameter.

EXAMPLE 6

Spincoating

Thin films of the PS-g-PDMS and PS-b-PDMS copolymers were made via spin coating from various solvents, such as chlorobenzene, toluene, and xylene. The film thicknesses were measured using profilometry and found to range from 0.2 μm to to 1.2 μm depending on the weight percent of the material in the spin coating solvent.

The present invention has been described herein with reference to its preferred embodiments. These embodiments do not serve to limit the invention, but are set forth for illustrative purposes. The scope of the invention is defined by the claims that follow.

That which is claimed is:

1. A method of forming a polymeric structure having a plurality of cells therein, said method comprising:
    contacting a polymeric material comprising a first phase that comprises a first polymer, and a second phase that comprises a second polymer, with a composition comprising carbon dioxide and a chemical decomposition agent the chemical decomposition agent being different than the second polymer and said chemical decomposition agent decomposing the second polymer to form the polymeric structure having a plurality of cells therein.

2. The method of claim 1, wherein the chemical decomposition agent comprises acid.

3. The method of claim 2, wherein the acid is substantially soluble in liquid and/or supercritical carbon dioxide.

4. The method of claim 2, wherein the acid is a halogen-containing acid.

5. The method of claim 2, wherein the acid is a fluorine-containing acid.

6. The method of claim 2, wherein the acid is trifluoroacetic acid or trifluorosulfonic acid.

7. The method of claim 1, wherein the chemical decomposition agent comprises a base.

8. The method of claim 7, wherein the base is substantially soluble in liquid and/or supercritical carbon dioxide.

9. The method of claim 1, wherein the composition comprising carbon dioxide comprises supercritical carbon dioxide.

10. The method of claim 1, wherein the composition comprising carbon dioxide comprises liquid carbon dioxide.

11. The method of claim 1, wherein the composition comprising carbon dioxide comprises gaseous carbon dioxide.

12. The method of claim 1, wherein the first polymer is selected from the group consisting of a polystyrene, a polyimide, a fluoropolymer, a poly(arylene)ether, a polyphenylene, and combinations thereof.

13. The method of claim 1, wherein the second polymer is selected from the group consisting of polydimethylsiloxane, a perfluoropolyether, a poly(butene sulfone), a poly(alkylene carbonate), a polyethylene glycol, and combinations thereof.

14. The method of claim 1, wherein the first phase is a continuous phase.

15. The method of claim 1, wherein the second phase is a discontinuous phase.

16. The method of claim 1, wherein the polymeric material comprises a copolymer that comprises the first phase and the second phase.

17. The method of claim 16, wherein the composition further comprises a chemical decomposition agent.

18. The method of claim 17, wherein the chemical decomposition agent comprises an acid.

19. The method of claim 16, wherein the copolymer is a block copolymer or a graft copolymer.

20. The method of claim 1, wherein the plurality of cells comprise closed cells.

21. The method of claim 1, wherein the cells in the plurality of cells have an average diameter of about 1 to 50 nm.

22. The method of claim 1, wherein the polymeric structure has a dielectric constant of about 1.5 to 3.5.

23. A method of forming a polymeric structure having a plurality of cells therein, wherein the cells in the plurality of cells have an average diameter of from about 1 to 25 nm, said method comprising:
    contacting a polymeric material comprising a first phase that comprises a first polymer, and a second phase that comprises a second polymer, with a composition comprising carbon dioxide and a chemical decomposition agent, the chemical decomposition agent being different than the second polymer and said chemical decomposition agent decomposing the second polymer to form the polymeric structure having a plurality of cells therein, wherein the cells in the plurality of cells have an average diameter of from about 1 to 25 nm.

24. The method of claim 23, wherein the cells in the plurality of cells have an average diameter of from about 2 to 20 nm.

25. The method of claim 23, wherein the cells in the plurality of cells have an average diameter of from about 3 to 15 nm.

26. The method of claim 23, wherein the cells in the plurality of cells have an average diameter of from about 4 to 10 nm.

27. The method of claim 23, wherein the cells in the plurality of cells have an average diameter of from about 5 to 8 nm.

28. The method of claim 23, wherein the plurality of cells comprise closed cells.

29. The method of claim 23, wherein the first polymer is selected from the group consisting of a polystyrene, a polyimide, a fluoropolymer, a poly(arylene)ether, a polyphenylene, and combinations thereof.

30. The method of claim 23, wherein the second polymer is selected from the group consisting of polydimethylsiloxane, a perfluoropolyether, a poly(butene sulfone), a poly(alkylene carbonate), a polyethylene glycol, and combinations thereof.

31. The method of claim 23, wherein the first phase is a continuous phase.

32. The method of claim 23, wherein the second phase is a discontinuous phase.

33. The method of claim 23, wherein the polymeric material comprises a copolymer that comprises the first phase and the second phase.

34. The method of claim 33, wherein the composition further comprises a chemical decomposition agent.

35. The method of claim 34, wherein the chemical decomposition agent comprises an acid.

36. The method of claim 33, wherein the copolymer is a block copolymer or a graft copolymer.

37. The method of claim 23, wherein the contacting of the polymeric material with the chemical decomposition agent occurs prior to the contacting of the polymeric material with the composition comprising carbon dioxide.

38. The method of claim 23, wherein the chemical decomposition agent is an acid.

39. The method of claim 22, wherein the carbon dioxide is supercritical carbon dioxide.

40. The method of claim 22, wherein the polymeric structure has a dielectric constant of about 1.5 to 3.5.

41. A method of forming a polymeric structure having a plurality of cells therein, wherein the polymeric structure has a dielectric constant of from about 1.5 to 3.5, said method comprising:
    contacting a polymeric material comprising a first phase that comprises a first polymer, and a second phase that comprises a second polymer, with a composition comprising carbon dioxide to form the polymeric structure having a plurality of cells therein, wherein the polymeric structure has a dielectric constant of from about 1.5 to 3.5.

42. The method of claim 41, wherein the polymeric material has a dielectric constant of from about 1.5 to 2.7.

43. The method of claim 41, wherein the polymeric material has a dielectric constant of from about 1.5 to 2.1.

44. The method of claim 41, wherein the cells in the plurality of cells have an average diameter of from about 1 to 50 nm.

45. The method of claim 41, wherein the polymeric material has a density of cells from about 0.2 to 1 g/cm$^3$ polymeric material.

46. The method of claim 41, wherein the polymeric material has a density of cells from about 0.7 to 0.9 g/cm$^3$ polymeric material.

47. The method of claim 41, wherein the plurality of cells comprise closed cells.

48. The method of claim 41, wherein the first phase is a continuous phase.

49. The method of claim 41, wherein the first phase is a continuous phase, wherein the plurality of cells comprise closed cells, wherein the cells in the plurality of cells have an average diameter of from about 1 to 50 nm, and wherein the polymeric material has a density of cells from about 0.2 to 1 g/cm$^3$ polymeric material.

50. The method of claim 41, wherein the first polymer is selected from the group consisting of a polystyrene, a polyimide, a fluoropolymer, a poly(arylene)ether, a polyphenylene, and combinations thereof.

51. The method of claim 41, wherein the second polymer is selected from the group consisting of polydimethylsiloxane, a perfluoropolyether, a poly(butene sulfone), a poly(alkylene carbonate), a polyethylene glycol, and combinations thereof.

52. The method of claim 41, wherein the second phase is a discontinuous phase.

53. The method of claim 41, wherein the polymeric material comprises a copolymer that comprises the first phase and the second phase.

54. The method of claim 53, wherein the chemical decomposition agent comprises an acid.

55. The method of claim 53, wherein the copolymer is a block copolymer or a graft copolymer.

56. The method of claim 41, further comprising contacting the polymeric material with a chemical decomposition agent.

57. The method of claim 56, wherein the contacting of the polymeric material with the chemical decomposition agent occurs prior to the contacting of the polymeric material with the composition comprising carbon dioxide.

58. The method of claim 56, wherein the chemical decomposition agent is an acid.

59. The method of claim 41, wherein the carbon dioxide is supercritical carbon dioxide.

60. A method of forming a polymeric structure having a plurality of cells therein, said method comprising:
    contacting a polymeric material comprising a copolymer having two or more phases, a continuous first phase of which comprises a first polymer chain, and a second phase of which comprises a second polymer chain, with a composition comprising carbon dioxide and a chemical decomposition agent to form the polymeric structure having a plurality of cells therein.

61. A method of forming a polymeric structure having a plurality of cells therein, wherein the cells in the plurality of cells have an average diameter of from about 1 to 25 nm, said method comprising:
    contacting a polymeric material comprising a copolymer having two or more phases, a continuous first phase of which comprises a first polymer chain, and a second phase of which comprises a second polymer chain, with a composition comprising carbon dioxide to form the polymeric structure having a plurality of cells therein, wherein the cells in the plurality of cells have an average diameter of from about 1 to 25 nm.

62. A method of forming a polymeric structure having a plurality of cells therein, wherein the polymeric material has a dielectric constant of from about 1.5 to 3.5, said method comprising:
    contacting a polymeric material comprising a copolymer having two or more phases, a continuous first phase of which comprises a first polymer chain, and a second phase of which comprises a second polymer chain, with a composition comprising carbon dioxide to form the polymeric structure having a plurality of cells therein, wherein the polymeric structure has a dielectric constant of from about 1.5 to 3.5.

* * * * *

UNITED STATES PATENT AND TRADEMARK OFFICE
CERTIFICATE OF CORRECTION

PATENT NO. : 6,765,030 B2
DATED : July 20, 2004
INVENTOR(S) : DeSimone et al.

It is certified that error appears in the above-identified patent and that said Letters Patent is hereby corrected as shown below:

Title page, Item [54] and Column 1, line 4,
Title, "THERAPY" should read -- THEREBY --

Title page,
Item [75], Inventor, "Paisner's" place of residence should read -- Carrboro, NC (US) --
Item [56], References Cited, OTHER PUBLICATION, should include:
-- J.L. Hedrick et al; "Templating Nanoporosity in Thin-Film Dielectric Insulators";
Adv. Mater. 10, No. 13 pp 1049-1053, 1998.
International Search Report for PCT/US 03/05548. --

Column 20,
Line 40, should read -- decomposition agent the chemical decomposition agent being different than the second polymer and said chemical decomposition agent decomposing the second polymer to form the polymeric structure --
Lines 50 and 62, should read -- a composition comprising carbon dioxide and a chemical decomposition agent, the chemical decomposition agent being different than the second polymer and said chemical decomposition agent decomposing the second polymer to form the --

Signed and Sealed this

Fourteenth Day of December, 2004

JON W. DUDAS
*Director of the United States Patent and Trademark Office*